US010886858B1

(12) United States Patent
Zhang et al.

(10) Patent No.: US 10,886,858 B1
(45) Date of Patent: Jan. 5, 2021

(54) MODULAR MULTI-LEVEL CONVERTER PRE-CHARGERS

(71) Applicant: University of Tennessee Research Foundation, Knoxville, TN (US)

(72) Inventors: Shuoting Zhang, Mountain View, CA (US); Fred Wang, Knoxville, TN (US); Leon M. Tolbert, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 0 days.

(21) Appl. No.: 16/653,458

(22) Filed: Oct. 15, 2019

(51) Int. Cl.
*H02M 7/483* (2007.01)
*H02M 7/493* (2007.01)
*H02M 7/537* (2006.01)
*H02M 5/458* (2006.01)
*H02M 1/36* (2007.01)

(52) U.S. Cl.
CPC .............. *H02M 7/483* (2013.01); *H02M 1/36* (2013.01); *H02M 7/537* (2013.01); *H02M 2007/4835* (2013.01)

(58) Field of Classification Search
CPC ......... H02M 7/483; H02M 2007/4835; H02M 7/493; H02M 7/537; H02M 5/458
See application file for complete search history.

(56) References Cited

U.S. PATENT DOCUMENTS

| | | | | |
|---|---|---|---|---|
| 10,193,469 | B2* | 1/2019 | Harnefors | H02M 7/483 |
| 10,270,328 | B2* | 4/2019 | Tengner | H02M 1/12 |
| 10,320,281 | B2* | 6/2019 | Yoshida | H02M 7/219 |
| 2012/0043816 | A1* | 2/2012 | Pereira | H02J 3/32 307/64 |
| 2012/0113698 | A1* | 5/2012 | Inoue | H02M 1/08 363/123 |
| 2014/0167726 | A1* | 6/2014 | Eckert | H02J 3/28 323/311 |
| 2016/0211762 | A1* | 7/2016 | Cheng | H02M 1/36 |
| 2016/0380571 | A1* | 12/2016 | Yoshida | H02H 7/1216 318/504 |
| 2018/0166972 | A1* | 6/2018 | Qi | H02M 1/32 |
| 2018/0191238 | A1* | 7/2018 | Tsuchiya | H02M 1/08 |
| 2020/0177097 | A1* | 6/2020 | Takahashi | H02M 7/483 |

\* cited by examiner

*Primary Examiner* — Thienvu V Tran
*Assistant Examiner* — Sisay G Tiku
(74) *Attorney, Agent, or Firm* — Jenkins, Wilson, Taylor & Hunt, P.A.

(57) ABSTRACT

Circuits and methods for power conversion. In some examples, a modular multi-level converter (MMC) is configured for power conversion between an alternating current (AC) bus and a direct current (DC) bus. The MMC includes submodules arranged into a phase leg for at least one phase of the AC bus. Each submodule includes an energy storage component and a switch configured for bypassing the energy storage component or connecting the energy storage component into the phase leg. The MMC includes a pre-charger circuit configured to pre-charge the energy storage components of the submodules. The pre-charger circuit is configured for providing a first DC voltage that is lower than a second DC voltage on the DC bus, and the pre-charger circuit is coupled to an end submodule of the phase leg.

18 Claims, 8 Drawing Sheets

MODULAR MULTI-LEVEL CONVERTER PRE-CHARGERS

This invention was made with government support under EEC1041877 awarded by National Science Foundation. The government has certain rights in the invention.

TECHNICAL FIELD

This specification relates generally to circuits for power conversion and in particular to modular multi-level converters.

BACKGROUND

A power conversion circuit converts electric power from alternating current (AC) to direct current (DC), or vice versa. A modular multi-level converter (MMC) is a power conversion circuit commonly used as a voltage-source converter for high voltage DC circuits. Typically, conventional MMCs include submodules arranged into phase legs, each submodule including its own storage capacitor. A pre-charger circuit is used to pre-charge the submodules.

Figure 1A:
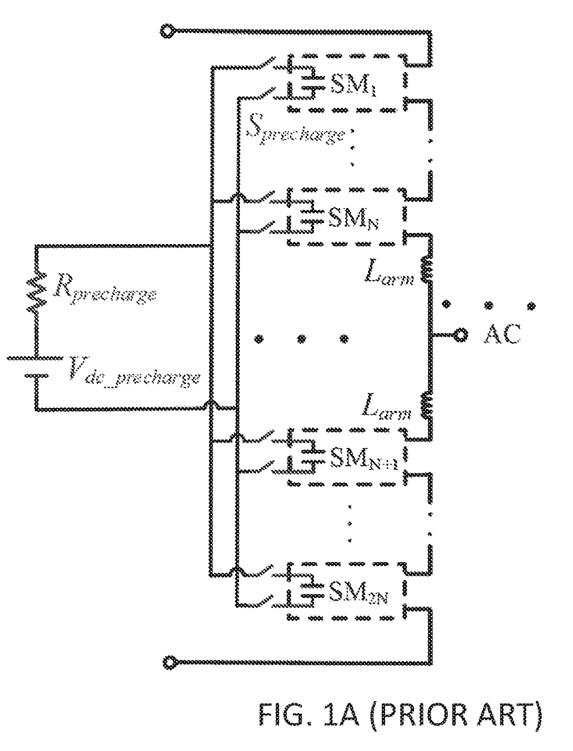
FIGS. 1A-1D illustrate conventional MMCs.
Figure 1B:
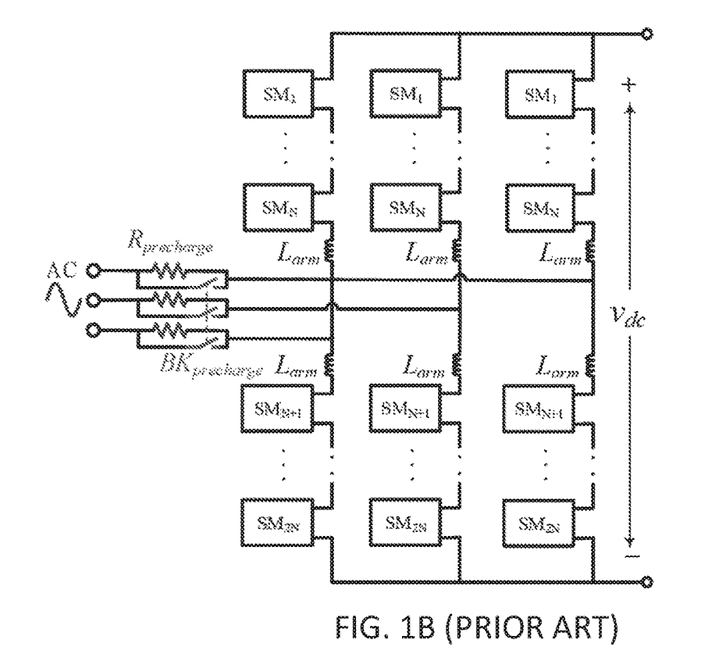
Figure 1C:
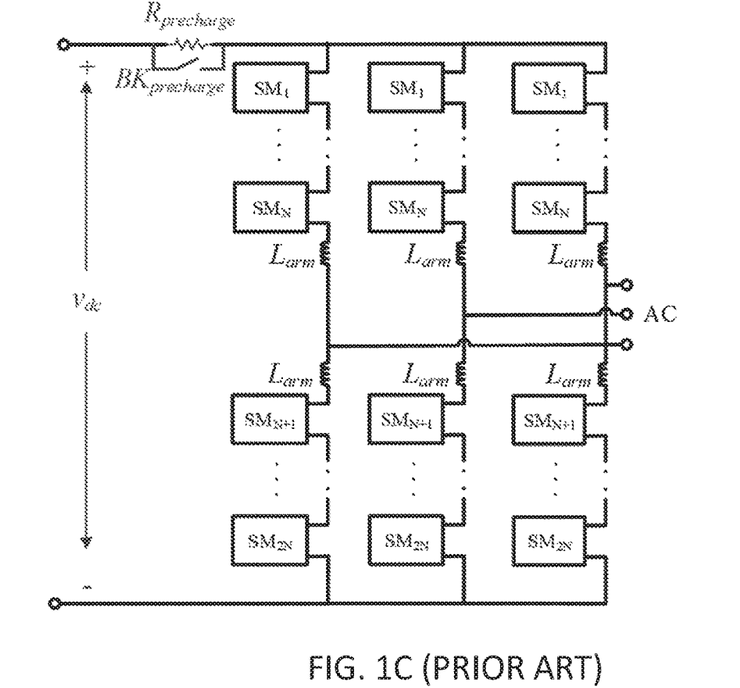
Figure 1D:
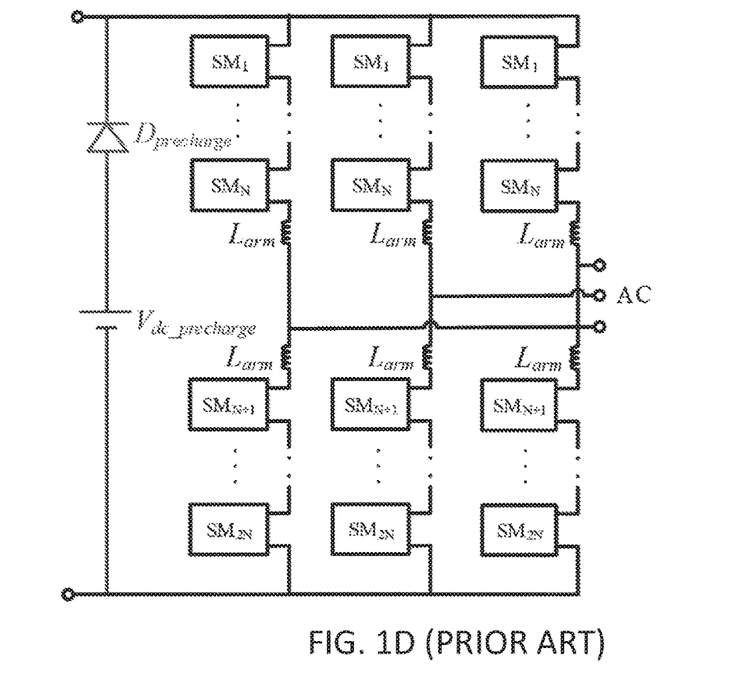

FIG. 1A shows an example MMC configured to pre-charge each submodule in the MMC with a separate charging circuit. FIG. 1B shows an example MMC configured to pre-charge by a grid-tied AC source through pre-charge resistors. FIG. 1C shows an example MMC configured to pre-charge by a DC source through pre-charge resistors. FIG. 1D shows an example MMC configured to pre-charge by an auxiliary DC supply connected on a DC bus through a high-voltage diode.

SUMMARY

This specification describes circuits and methods for power conversion. In some examples, a modular multi-level converter (MMC) is configured for power conversion between an alternating current (AC) bus and a direct current (DC) bus. The MMC includes submodules arranged into a phase leg for at least one phase of the AC bus. Each submodule includes an energy storage component and a switch configured for bypassing the energy storage component or connecting the energy storage component into the phase leg. The MMC includes a pre-charger circuit configured to pre-charge the energy storage components of the submodules. The pre-charger circuit is configured for providing a first DC voltage that is lower than a second DC voltage on the DC bus, and the pre-charger circuit is coupled to an end submodule of the phase leg.

Accordingly, it is an object of the presently disclosed subject matter to provide a modular multi-level converter (MMC) configured for power conversion between an alternating current (AC) bus and a direct current (DC) bus. This and other objects are achieved in whole or in part by the presently disclosed subject matter. Further, an object of the presently disclosed subject matter having been stated above, other objects and advantages of the presently disclosed subject matter will become apparent to those skilled in the art after a study of the following description and figures.

DETAILED DESCRIPTION

The presently disclosed subject matter provides circuits and methods for power conversion. In some examples, a universal and cost-effective pre-charger, comprising an auxiliary DC supply and a diode, is configured to charge submodule capacitors in modular-multilevel-converters (MMCs). The DC supply is connected to the MMC bottom submodule DC link through the diode so that the DC supply and diode voltages are within the submodule DC bus voltage. Any phase leg can cooperate with another phase leg to charge its submodule capacitors, except for the bottom one, by operating in a boost converter mode. After fully pre-charging other submodule capacitors, the bottom submodule capacitors are pre-charged with a portion of energy stored in other submodule capacitors by coordinating two phase legs in a buck converter mode.

Figure 2:
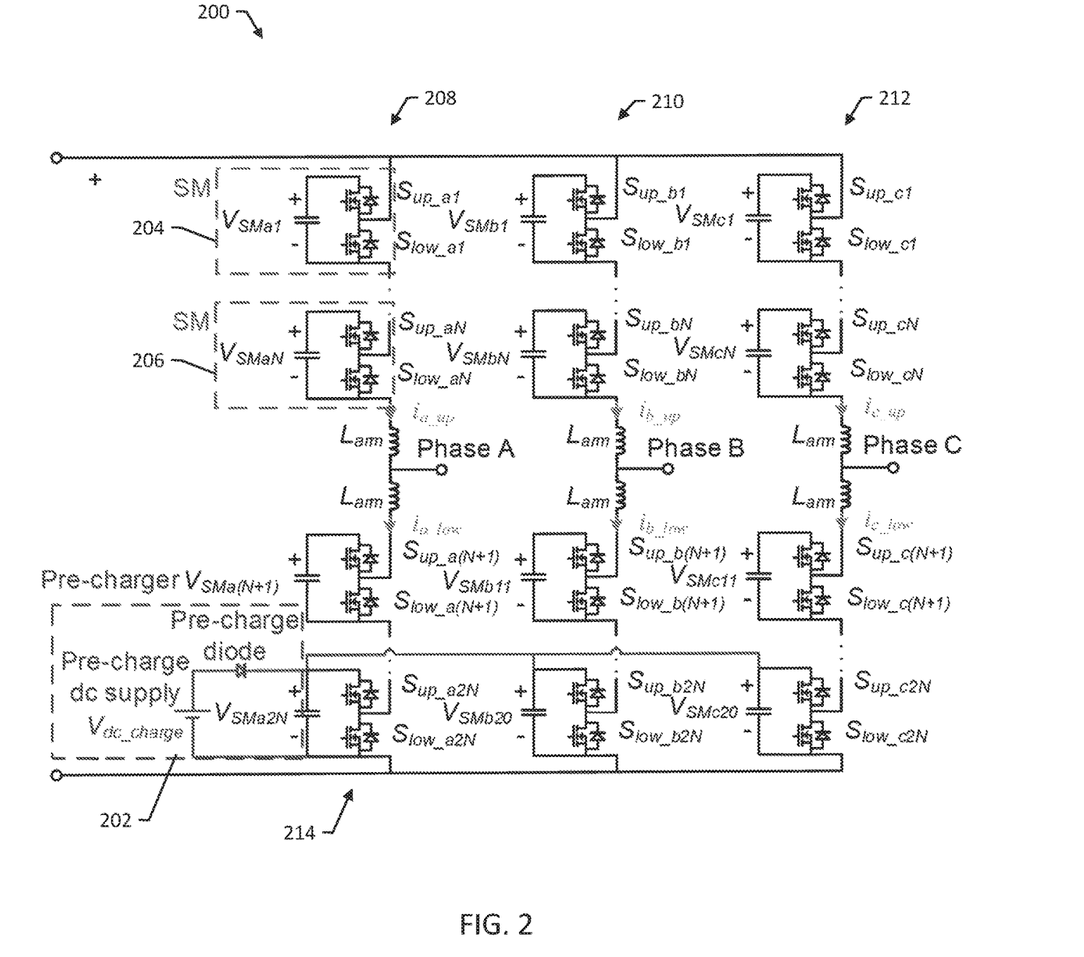
FIG. 2 is a circuit diagram of an example MMC configured for power conversion between an AC bus and a DC bus.

FIG. 2 is a circuit diagram of an example MMC 200 configured for power conversion between an AC bus and a DC bus. The MMC 200 includes a pre-charger circuit 202 configured for pre-charging a number of submodules, e.g., submodules 204 and 206. The submodules are arranged into three phase legs 208, 210, and 212. Each submodule includes an energy storage component, e.g., a capacitor, and a switch, e.g., a pair of transistors or other arrangement of transistors, configured for bypassing the energy storage component or connecting the energy storage component into one of the phase legs 208, 210, and 212. Each phase leg is a string of submodules that are coupled together, end-to-end, from a high-side terminal to a low-side terminal of the MMC 200.

The pre-charger circuit 202 is configured to pre-charge the energy storage components of the submodules. The pre-charger circuit 202 includes a pre-charge DC voltage supply and a pre-charge diode. The pre-charge DC voltage supply is a low-voltage supply, i.e., in that the pre-charge DC voltage supply is configured for providing a DC voltage that is lower than the DC voltage on the DC bus. Because the pre-charge DC voltage is lower than the DC voltage on the DC bus, the pre-charge diode can be a diode with a rated voltage less than the voltage on the DC, which can be useful for avoiding a costly diode rated for the full DC voltage.

The pre-charger circuit 202 is coupled to an end submodule of the phase leg. The end submodule is at one end or the other of a phase leg, i.e., the end submodule is coupled to a high-side terminal or a low-side terminal. As shown in FIG. 2, the pre-charger 202 is coupled to the bottom submodule 214 of the first phase leg 208. The bottom submodule 214 is coupled to a low-side terminal of the MMC 200.

The pre-charger circuit 202 is configured for controlling the switches of the submodules and, in a first pre-charging operation, pre-charging all of the submodules in the phase leg except for the end submodule of the phase leg. Controlling the switches of the submodules includes, in a second pre-charging operation after the first pre-charging operation, pre-charging the end submodule of the phase leg using a portion of the energy stored in the other modules of the phase leg.

For example, consider the first phase leg 208. The pre-charger circuit 202 is configured for pre-charging all of the submodules in the phase leg 208 except for the bottom submodule 214 in a first pre-charging operation. The pre-charger circuit 202 is configured for pre-charging the bottom submodule 214 in a second pre-charging operation using a portion of the energy stored in the other submodules of the phase leg 208.

Typically, pre-charging all of the submodules in the phase leg except for the end submodule of the phase leg includes pre-charging all of the submodules except for the end submodule to a pre-set voltage higher than a rated voltage for the MMC to reserve energy for pre-charging the end submodule. In this manner, when the end submodule is pre-charged to the rated voltage, the voltage on the other submodules is reduced from the pre-set voltage to the rated voltage, such that all of the submodules in the phase leg are pre-charged to the rated voltage when pre-charging is complete.

In general, the MMC 200 is configured such that the phase legs cooperate to perform pre-charging. Two phase legs cooperate to pre-charge all of the submodules except for the end submodule in a boost converter mode, and then two phase legs cooperate to pre-charge the end module in a buck converter mode.

For example, the first phase leg 208 and the second phase leg 210 can be configured for operating in a boost converter mode for pre-charging all of the submodules in the first phase leg 208 except for the bottom submodule 214 of the first phase leg 208. Similarly, the second phase leg 210 and the third phase leg 212 can be configured for operating in a boost converter mode for pre-charging submodules of the second phase leg 210, and the third phase leg 212 can be configured for operating in a boost converter mode with the first phase leg 208 or the second phase leg 210 for pre-charging submodules of the third phase leg 212.

The first phase leg 208 and the second phase leg 210 can be configured for operating in a buck converter mode for pre-charging the bottom submodule 214 of the first phase leg 208. Similarly, the second phase leg 210 and the third phase leg 212 can be configured for operating in a buck converter mode for pre-charging a bottom submodule of the second phase leg 210, and the third phase leg 212 can be configured for operating in a buck converter mode with the first phase leg 208 or the second phase leg 210 to pre-charge a bottom submodule of the third phase leg 212. The end submodules can be pre-charged sequentially, e.g., by pre-charging one end submodule first and then another end submodule after the first end submodule.

FIGS. 3-6 illustrate the pre-charging operations in greater detail. A first pre-charging operation includes pre-charging submodules in one phase leg except for the $SM_{x2N}$ (x is a, b, or c representing the phase). A second pre-charging operation includes pre-charging the $SM_{x2N}$ submodules.

Figure 3:
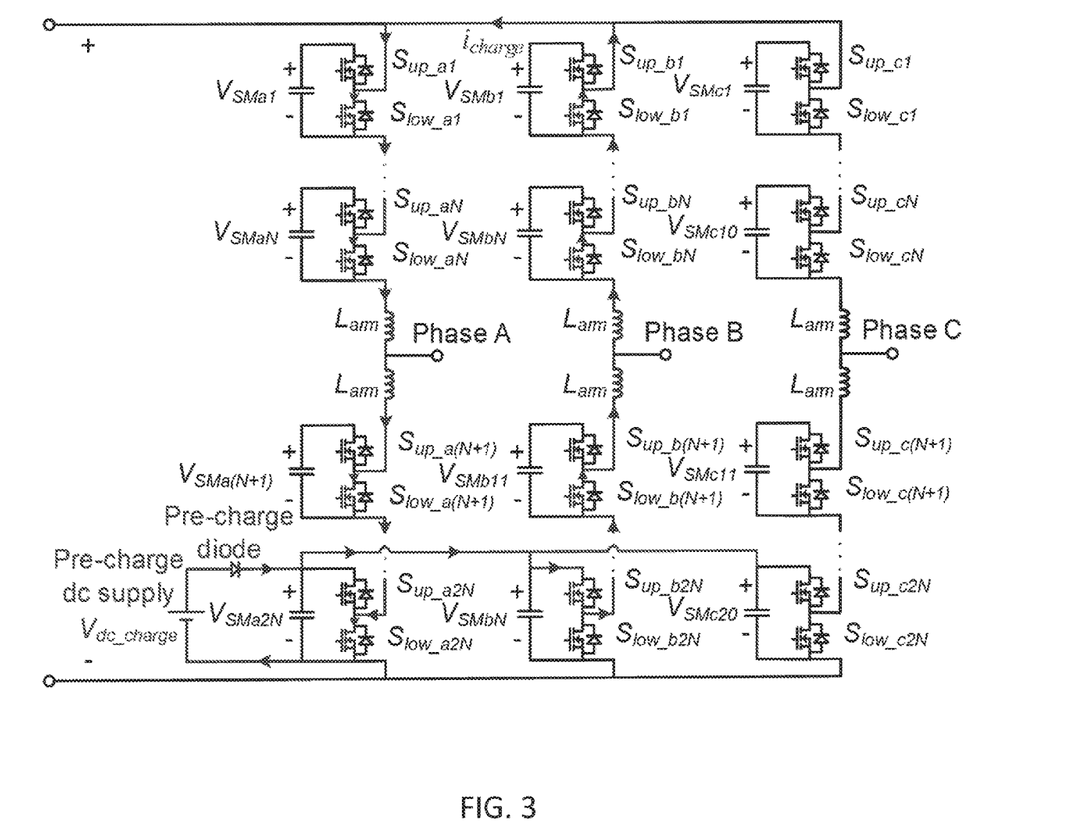
FIG. 3 illustrates delivering energy from a pre-charge DC supply to two phase legs inductors by increasing current.
Figure 4:
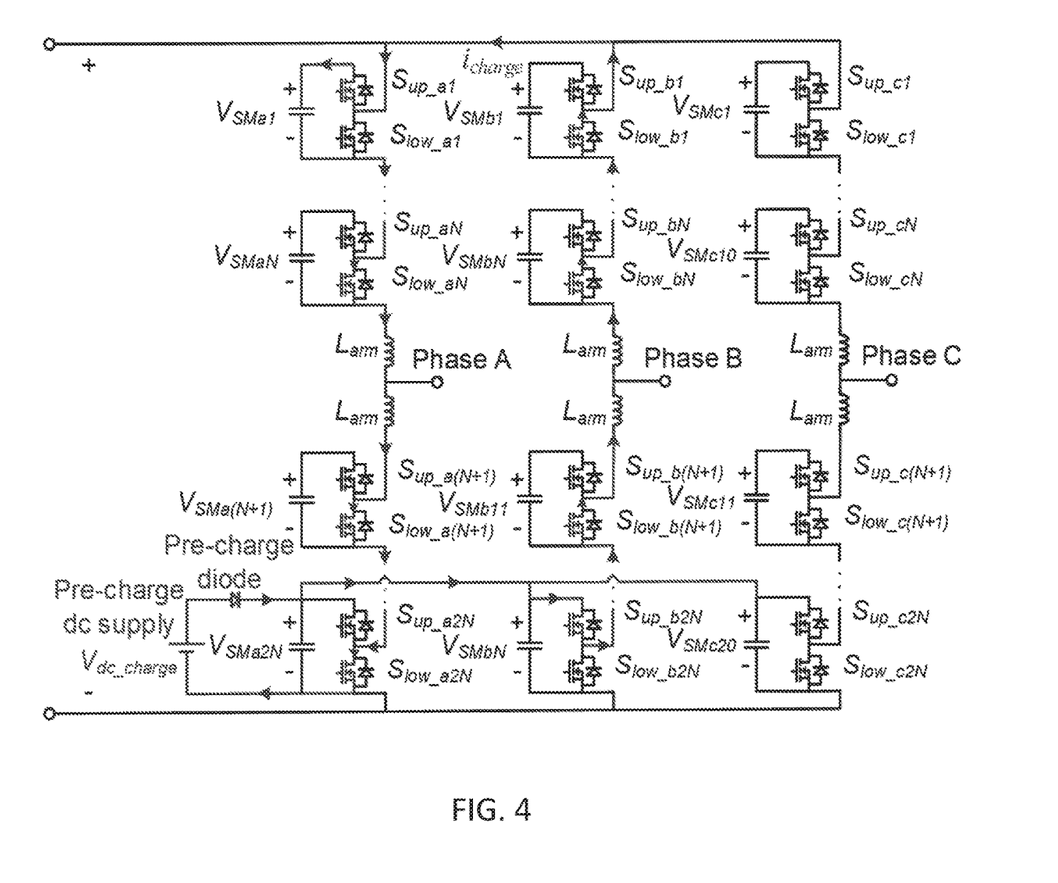
FIG. 4 illustrates delivering energy from two phase legs inductors to a submodule capacitor.

FIG. 3 and FIG. 4 show the two operating statuses in sequence to pre-charge the $SM_{am}$ (m is 1, 2, or 2N-1) with the pre-charge DC supply. First, the pre-charge DC supply energy is delivered to phase A and phase B arm inductors by increasing the current $i_{charge}$ through turning on the phase B bottom submodule upper switch $S_{up\_b2N}$ and the lower switches of all the other submodules in phase A and phase B, as shown in FIG. 3. Second, after the $i_{charge}$ reaches a pre-set upper bound value, the energy stored in phase A and phase B arm inductors is delivered to a phase A submodule capacitor by turning on the submodule upper switch, as shown in FIG. 4. After the $i_{charge}$ decreases to a pre-set lower bound value, repeat the above two steps until all $SM_{am}$ (m is 1, 2, or 2N-1) are pre-charged to a pre-set value. By using the same method, phase B and phase C submodules except for the $SM_{b2N}$ and $SM_{c2N}$ can also be pre-charged to the pre-set value.

Because the $SM_{a2N}$, $SM_{b2N}$ and $SM_{c2N}$ DC links are directly connect to the pre-charge DC supply through the pre-charge diode, they are not able to be pre-charged by the pre-charge DC supply. Instead, a part of the energy pre-charged and stored in the $SM_{xm}$ (x is a, b, or c representing the phase; m is 1, 2, . . . or 2N-1 representing the SM number) is utilized to pre-charge the $SM_{a2N}$, $SM_{b2N}$ and $SM_{c2N}$.

Figure 5:
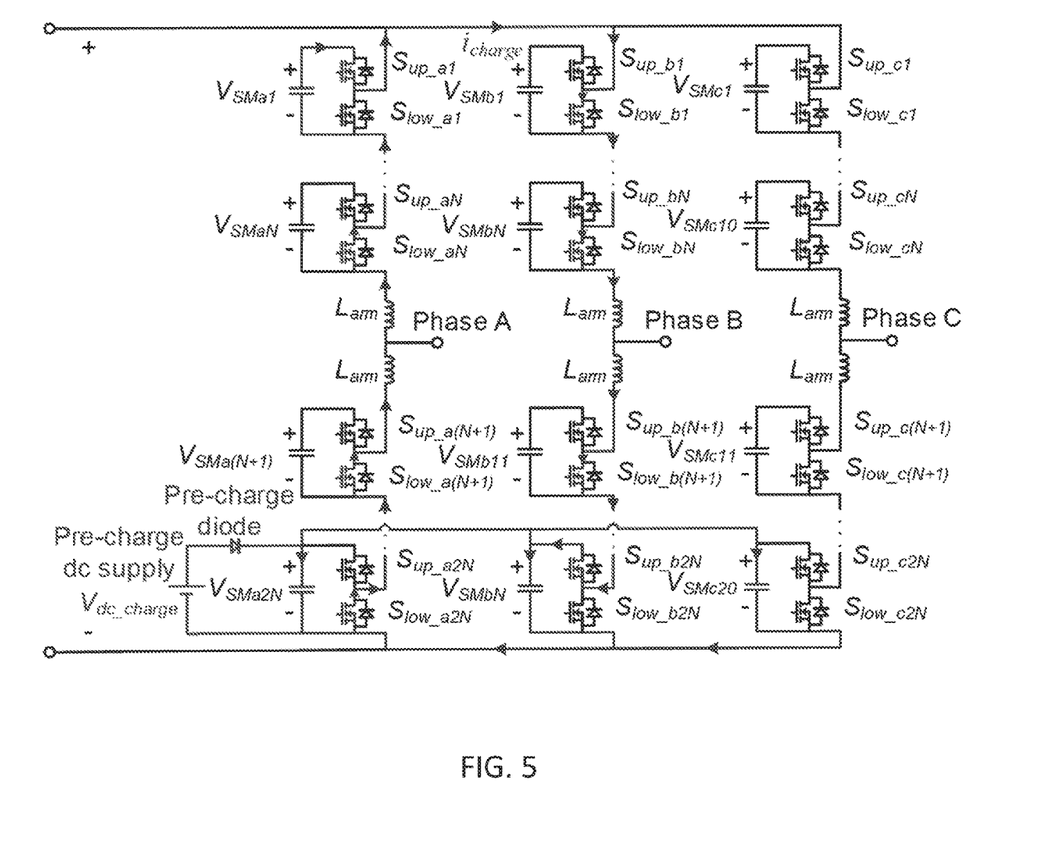
FIG. 5 illustrates delivering energy from one submodule in one phase leg to inductors of that phase leg and another phase leg by increasing current.
Figure 6:
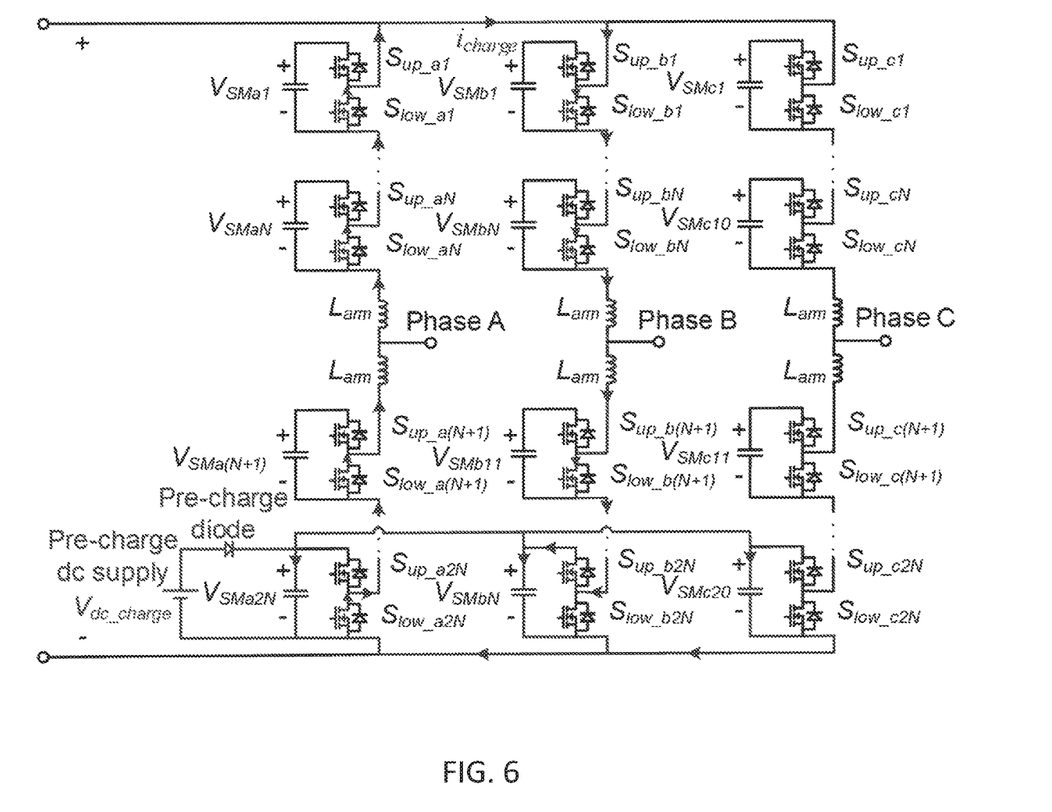
FIG. 6 illustrates delivering energy from two phase legs inductors to an end submodule.

In the first pre-charging operation, the $SM_{xm}$ is pre-charged to a pre-set value slightly higher than the rated voltage to reserve energy for pre-charging the $SM_{a2N}$, $SM_{b2N}$ and $SM_{c2N}$. In the second pre-charging operation, any two phases cooperate to operate in a buck converter mode to pre-charge the $SM_{a2N}$, $SM_{b2N}$, and $SM_{c2N}$ with the $SM_{xm}$. FIG. 5 and FIG. 6 show the two operating statuses in sequence to pre-charge the $SM_{b2N}$ with the energy stored in $SM_{am}$ (m is 1, 2, . . . or 2N-1).

First, the energy in $SM_{am}$ (m is 1, 2, . . . or 2N-1) is delivered to phase A and phase B arm inductors by increasing the current $i_{charge}$ through turning on the $S_{up\_am}$ (m is 1, 2, . . . or 2N-1), as shown in FIG. 5. Second, after the $i_{charge}$ reaches a pre-set upper bound value, the energy stored in phase A and phase B arm inductors is delivered to $SM_{b2N}$ by turning on $S_{up\_b2N}$ and all lower switches of the other submodules in phase A and phase B, as shown in FIG. 6. After the $i_{charge}$ decreases to a pre-set lower bound value, repeat the above two steps until either all $SM_{am}$ (m is 1, 2, . . . or 2N-1) or $SM_{b2N}$ reaches the rated value. By using the same method, the $SM_{c2N}$ can be pre-charged by the $SM_{bm}$ (m is 1, 2, . . . or 2N-1) and the $SM_{a2N}$ can be pre-charged by the $SM_{cm}$ (m is 1, 2, . . . or 19) successively.

Figure 7:
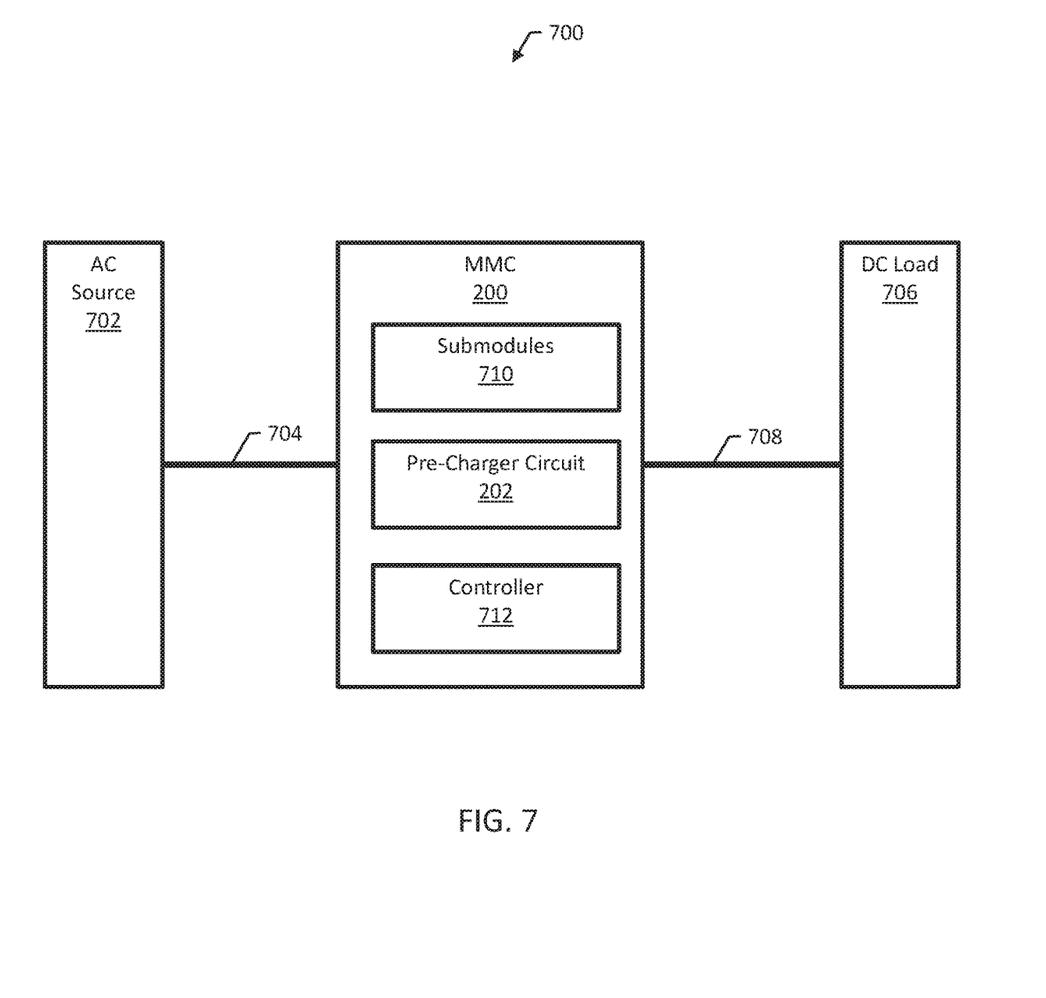
FIG. 7 is a block diagram of an example power conversion system.

FIG. 7 is a block diagram of an example power conversion system 700 that uses the MMC 200 of FIG. 2 for power conversion. The system 700 includes an AC source 702, e.g., a utility grid. The MMC 200 is coupled to the AC source 207 by an AC bus 704. The MMC 200 receives AC power from the AC bus 704 and supplies DC power to a DC load 706 on a DC bus 708. The MMC 200 can be useful, in particular, in high voltage DC applications. High voltage DC is used as an alternative to AC for transmitting electrical energy over long distances or between AC power systems of different frequencies.

The AC bus 704 can supply three-phase power, in which case the MMC 200 is configured with three phase legs of submodules 710. In general, the MMC 200 can have any appropriate number of phase legs depending on the application. The MMC 200 includes a controller 712 for controlling the switches of the submodules 710. The controller 712 is configured for pre-charging the submodules 710 using the pre-charger circuit 202 and by controlling the switches of the submodules. The controller 712 can be implemented in hardware, software, firmware, or any combination thereof. For example, the controller 712 can be implemented as a processor and memory storing executable instructions for the processor.

The MMC 200 can be implemented as a half-bridge MMC. Alternatively, the pre-charger circuit 202 can be implemented in full-bridge and hybrid MMC topologies. In some examples, instead of a DC supply and a diode, the pre-charger circuit 202 can be implemented with a bi-directional DC/DC converter to pre-charge the MMC 200.

The pre-charger circuit 202 can be used to pre-charge MMCs flexibly without relying on the MMC AC or DC bus sources. All devices voltages of the MMC pre-charger do not need to exceed the submodule DC voltage, which is smaller than the MMC DC bus voltage. Comparing with some conventional pre-charging methods, the pre-charger circuit 202 is more flexible, cost effective, and has a smaller size.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A modular multi-level converter (MMC) configured for power conversion between an alternating current (AC) bus and a direct current (DC) bus, the MMC comprising:
    a plurality of submodules arranged into a phase leg for at least one phase of the AC bus, each submodule comprising an energy storage component and a switch configured for bypassing the energy storage component or connecting the energy storage component into the phase leg; and
    a pre-charger circuit configured to pre-charge the energy storage components of the submodules, wherein the pre-charger circuit comprises a pre-charge DC voltage supply and a pre-charge diode and the pre-charge DC voltage supply is configured for providing a first DC voltage that is lower than a second DC voltage on the DC bus, and wherein the pre-charger circuit is coupled to an end submodule of the phase leg;
    wherein the pre-charger circuit is configured for controlling the switches of the submodules and, in a first pre-charging operation, pre-charging all of the submodules in the phase leg except for the end submodule of the phase leg.

2. The MMC of claim 1, wherein controlling the switches of the submodules comprises, in a second pre-charging operation after the first pre-charging operation, pre-charging the end submodule of the phase leg using a portion of an energy stored in other modules of the phase leg.

3. The MMC of claim 2, wherein pre-charging all of the submodules in the phase leg except for the end submodule of the phase leg comprises pre-charging all of the submodules except for the end submodule to a pre-set voltage higher than a rated voltage for the MMC to reserve energy for pre-charging the end submodule.

4. The MMC of claim 2, comprising a second plurality of submodules arranged into a second phase leg for a second phase of the AC bus, wherein the phase leg and the second phase leg are configured for operating in a boost converter mode for pre-charging all of the submodules in the phase leg except for the end submodule of the phase leg.

5. The MMC of claim 2, comprising a second plurality of submodules arranged into a second phase leg for a second phase of the AC bus, wherein the phase leg and the second phase leg are configured for operating in a buck converter mode for pre-charging the end submodule of the phase leg and a second end submodule of the second phase leg.

6. The MMC of claim 5, wherein pre-charging the end submodule of the phase leg and the second end submodule of the second phase leg comprises pre-charging the end submodule first and then, after pre-charging the end submodule, pre-charging the second end submodule of the second phase leg.

7. The MMC of claim 1, wherein the AC bus is configured for carrying three-phase power, and wherein the MMC comprises a second phase leg and a third phase leg.

8. The MMC of claim 1, wherein the energy storage component of each submodule comprises a capacitor, and wherein the switch of each submodule comprises a pair of transistors.

9. The MMC of claim 1, wherein the pre-charge diode has a rated voltage less than the second DC voltage on the DC bus.

10. A method for power conversion between an alternating current (AC) bus and a direct current (DC) bus using a modular multi-level converter (MMC), the method comprising:
    pre-charging each energy storage component of a plurality of submodules of the MMC arranged into a phase leg for at least one phase of the AC bus, each submodule comprising a switch configured for bypassing the energy storage component or connecting the energy storage component into the phase leg;
    converting power between the AC bus and the DC bus using the MMC and energy stored in the plurality of submodules; and
    controlling the switches of the submodules and, in a first pre-charging operation, pre-charging all of the submodules in the phase leg except for the end submodule of the phase leg;
    wherein pre-charging the energy storage components comprises providing a first DC voltage that is lower than a second DC voltage on the DC bus using a pre-charger circuit coupled to an end submodule of the phase leg.

11. The method of claim 10, wherein controlling the switches of the submodules comprises, in a second pre-charging operation after the first pre-charging operation, pre-charging the end submodule of the phase leg using a portion of an energy stored in other modules of the phase leg.

12. The method of claim 11, wherein pre-charging all of the submodules in the phase leg except for the end submodule of the phase leg comprises pre-charging all of the submodules except for the end submodule to a pre-set voltage higher than a rated voltage for the MMC to reserve energy for pre-charging the end submodule.

13. The method of claim 11, wherein the MMC comprises a second plurality of submodules arranged into a second phase leg for a second phase of the AC bus, wherein the method comprises operating the phase leg and the second phase leg in a boost converter mode for pre-charging all of the submodules in the phase leg except for the end submodule of the phase leg.

14. The method of claim 11, wherein the MMC comprises a second plurality of submodules arranged into a second phase leg for a second phase of the AC bus, wherein the method comprises operating the phase leg and the second phase leg in a buck converter mode for pre-charging the end submodule of the phase leg and a second end submodule of the second phase leg.

15. The method of claim 14, wherein pre-charging the end submodule of the phase leg and the second end submodule of the second phase leg comprises pre-charging the end submodule first and then, after pre-charging the end submodule, pre-charging the second end submodule of the second phase leg.

16. The method of claim 10, wherein the AC bus is configured for carrying three-phase power, wherein the MMC comprises a second phase leg and a third phase leg, wherein the energy storage component of each submodule comprises a capacitor, wherein the switch of each submodule comprises a pair of transistors, wherein the pre-charger circuit comprises a pre-charge DC voltage supply and a pre-charge diode, and wherein the pre-charge diode has a rated voltage less than the second DC voltage on the DC bus.

17. A modular multi-level converter (MMC) configured for power conversion between an alternating current (AC) bus and a direct current (DC) bus, the MMC comprising:
 a plurality of submodules arranged into a phase leg for at least one phase of the AC bus, each submodule comprising an energy storage component and a switch configured for bypassing the energy storage component or connecting the energy storage component into the phase leg; and
 a pre-charger circuit configured to pre-charge the energy storage components of the submodules, wherein the pre-charger circuit is configured for providing a first DC voltage that is lower than a second DC voltage on the DC bus, and wherein the pre-charger circuit is coupled to an end submodule of the phase leg;
 wherein the pre-charger circuit is configured for controlling the switches of the submodules and, in a first pre-charging operation, pre-charging all of the submodules in the phase leg except for the end submodule of the phase leg.

18. The MMC of claim 17, wherein the pre-charger circuit comprises a bi-directional DC/DC converter.

* * * * *